April 16, 1957  N. G. KLING  2,788,681

SPEED CHANGE MECHANISM

Filed Jan. 13, 1955  4 Sheets-Sheet 2

INVENTOR.
Nelson G. Kling
BY
ATTORNEYS

April 16, 1957 N. G. KLING 2,788,681
SPEED CHANGE MECHANISM
Filed Jan. 13, 1955 4 Sheets-Sheet 3

INVENTOR.
Nelson G. Kling
BY
ATTORNEYS

INVENTOR.
Nelson G. Kling
BY
ATTORNEYS

United States Patent Office 2,788,681
Patented Apr. 16, 1957

2,788,681

SPEED CHANGE MECHANISM

Nelson G. Kling, Roslyn, N. Y., assignor, by mesne assignments, to Technicon Instruments Corporation, Chauncey, N. Y.

Application January 13, 1955, Serial No. 481,646

15 Claims. (Cl. 74—812)

The present invention relates to speed change mechanism.

The primary object of the present invention is the provision of a generally improved and simplified speed change mechanism which is highly efficient and reliable in operation.

Another object is the provision of a speed change mechanism having provision for eight speed changes with a control device having only four positions.

Another object is the provision of a speed change mechanism wherein provision is made for two speed multiplier changes of a gear shaft by the reversal of the drive motor and therefore eliminates the necessity for duplication of gear shafts.

The above and other objects, features and advantages of the present invention will be more fully understood from the following description considered in connection with the accompanying illustrative drawings.

In the drawings which illustrate the best mode presently contemplated of carrying out the invention:

Figure 1:
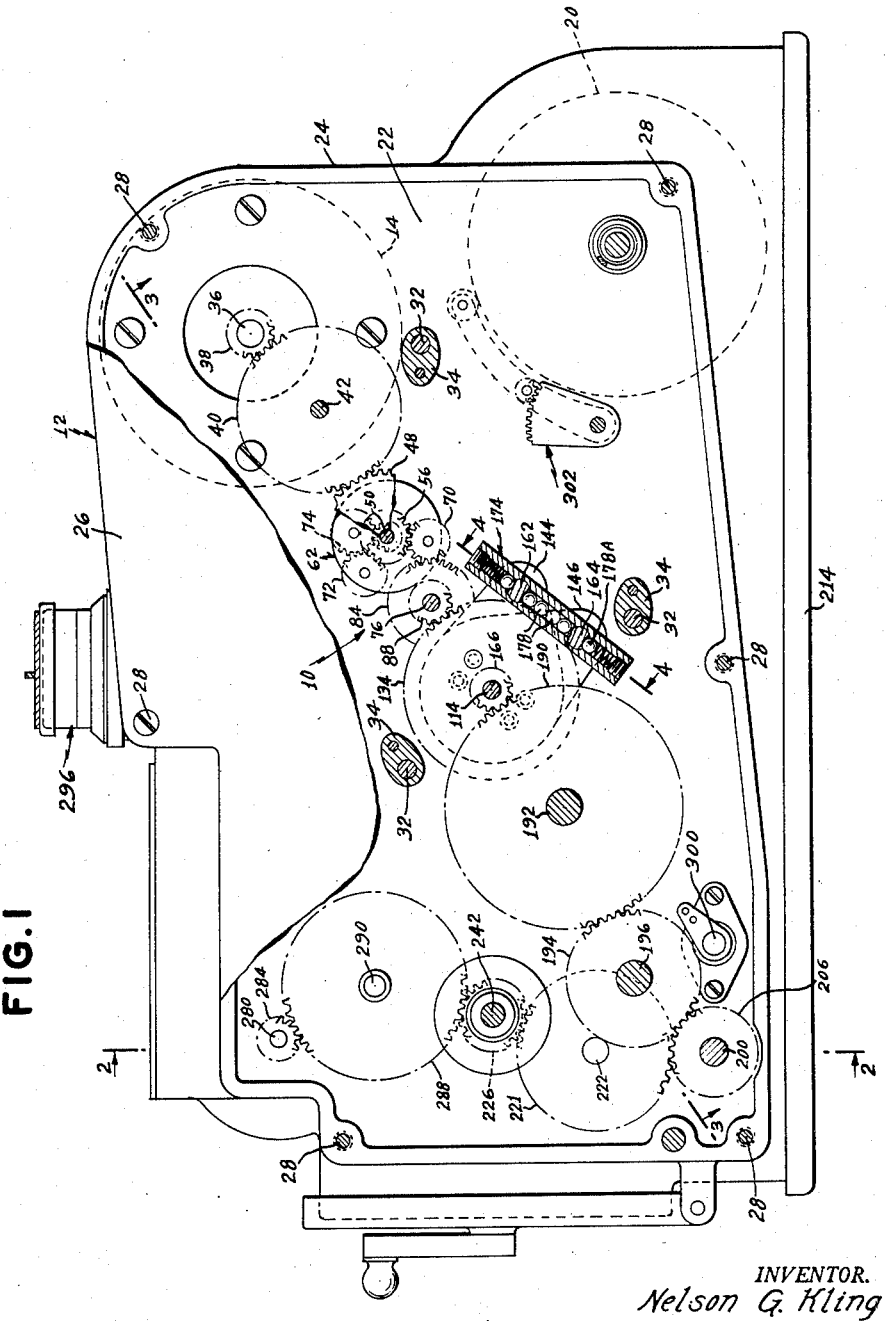
Fig. 1 is a top plan view of a camera provided with a speed change mechanism pursuant to the present invention, portions of the camera being broken away for purposes of illustration.

Referring now to the drawings in detail, the speed change mechanism, of the present invention, indicated generally by the reference numeral 10, is illustrated and described herein, by way of example and not by way of limitation, in connection with a camera 12 of a type fully illustrated, described and claimed in my copending application, Serial No. 453,316, filed August 31, 1954, and assigned to the assignee hereof. However, it will be understood that the speed change mechanism 10 is not limited to use with the particular apparatus or device 12 but that it may be incorporated in any suitable apparatus or device where it is desired to provide for a simple and efficient speed change means.

As herein shown, the camera 12 is provided with a suitable drive motor 14 which operates through the speed change mechanism 10 to continuously drive a film wind-up spool 15, within a film cassette 16, and a film drive roll 18 for withdrawing film from a film supply spool 20. In addition, the motor 14 is effective, through the speed change mechanism, to drive a film printing roller 21 and a potentiometer 22, the functions of which are hereinafter described. Since the various elements or parts, which are driven by the motor 14 through the speed change mechanism, do not, per se, constitute part of the present invention, they are not illustrated or described in detail, herein, except insofar as may be necessary for a description of the speed change mechanism 10. For a detailed explanation and illustration of said various parts and elements, reference is made to my previously identified copending application.

As here shown, the speed change mechanism 10, and the associated gearing for driving the previously indicated parts, are disposed within a chamber 22 (Fig. 3) defined by the casing 24 of the camera and by a cover plate 26 which is secured to the casing, as by the securing elements 28. A mounting plate 30 is mounted in position below the cover 26 by means of the securing elements 32 which engage in bosses 34 provided on the casing. The motor 14 is suitably mounted on the casing or frame 24 and the motor drive shaft 36 extends into the chamber 22.

The motor shaft 36 is provided with a gear 38 which is suitably keyed thereto. The gear 38 meshes with an idler gear 40 which is keyed to the shaft 42. The shaft 42 is journalled in the bearings 44 and 46 which are mounted, respectively, by the casting 24 and the mounting plate 30. The idler gear 40 meshes with a gear 48 which is keyed to the drive shaft 50, the latter being journalled in the bearings 52 and 54 mounted by the casting 24 and the mounting plate 30, respectively. A gear 56 is also keyed to the shaft 50 and in addition, an integral portion of the shaft is formed into a gear 58 which is spaced from the gear 56. A pair of bearing elements 60 are mounted on the shaft 50 and abut the gears 56 and 58 respectively. A drum 62 is carried by the bearings 60 being mounted thereby for rotation relative to the shaft 50. The drum 62 mounts the three shafts 64, 66 and 68 at equal radial distances from the center of the drum. Said shafts are keyed to the drum 62, it being noted that the shaft 64 projects from one side thereof and the shaft 66 and 68 project from the other side thereof. The gear 70 is mounted for rotation on the shaft 64 and the gears 72 and 74 are mounted for rotation on the shafts 66 and 68 respectively. A driven shaft 76 is journalled in the bearings 78 and 80 provided in the casting 24 and the mounting plate 30, respectively. As here shown, four idler gears 82, 84, 86 and 88 are keyed to the shaft 76, it being noted from Fig. 3 that said gears are of different diameters, respectively.

The drive motor 14 is preferably an A. C. synchronous motor of the hysteresis type and is provided with a conventional double pole-double throw switch (not illustrated) for reversing the direction of rotation of the shaft 36. With the shaft 36 rotating in the direction of the arrow 90 in Fig. 5, it will be apparent that the idler gear 40 will rotate in the direction of the arrow 92, and the drive shaft 50 will rotate in the same direction as the shaft 36, as indicated by the arrow 94. It will be understood that there is a loose friction fit between the drum 62 and the bearings 60, which latter have a close or tight friction fit on the shaft 50. Consequently the rotation of the shaft 50 in the direction of the arrow 94 will provide an initial rotation of the drum 62 in the direction of the arrow 96 which will be sufficient to carry the gear 70, which is meshed with gear 56, into driving engagement with the gear 84 so that the driven shaft 76 is rotated in the same direction as the shaft 50, said gears 56 and 70 constituting gear drive means for driving the shaft 76.

Figure 5:
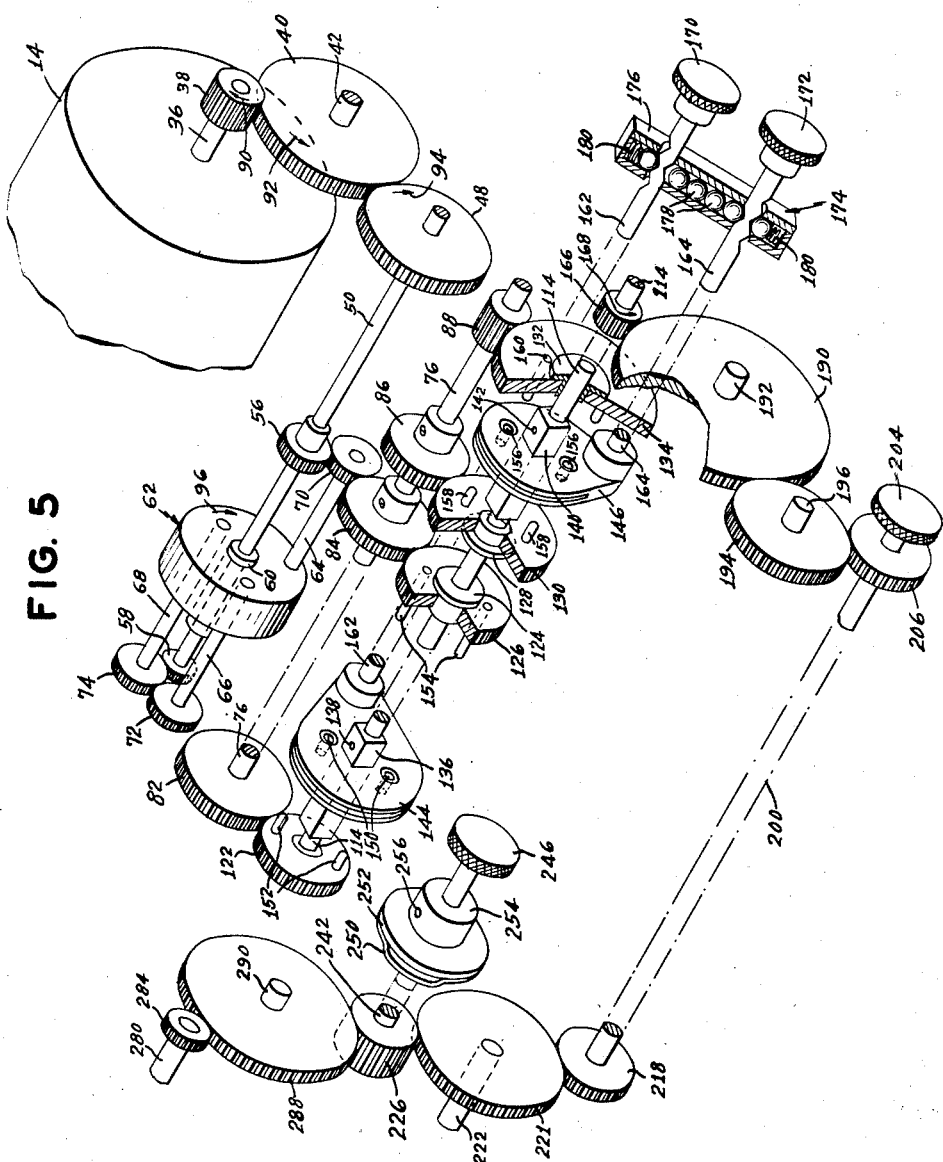
Fig. 5 is a diagrammatic illustration of the speed change mechanism in one condition thereof.

When the motor shaft 36 is rotated in the opposite direction so as to effect the rotation of the shaft 50 in a direction opposite that indicated by the arrow 94, it will be apparent that the drum 62, due to the previously described loose friction engagement with the shaft 50, will rotate partially in the opposite direction to mesh the gear 72 with the gear 82. Since the gear 58 on the shaft 50 is normally engaged with the gear 74, and the latter is normally engaged with the gear 72, as illustrated in Fig. 5, it will be apparent that the engagement of gear 72 with the gear 82 will now drive the shaft 76 in the manner illustrated in Fig. 6. More specifically, as herein shown, with the shaft 36 rotating in the direction of the arrow 98 to effect the rotation of the shaft 42 in the direction of the arrow 100, the shaft 50 is now driven in the direction of the arrow 102. This effects the described partial rotation of the drum 62 in the direction indicated by the arrow 104 thereon to mesh the gear 72 with a gear 82. However, the gear 58 on the shaft 50 being now rotated in the direction of the arrow 106, rotates the idler gear 74 in the direction of the arrow 108, and the latter gear rotates the gear 72 in the direction of the arrow 110. This results in the rotation of the gear 82 in the direction of the arrow 112. Consequently, it will be noted that the gear 82 now rotates in the same direction in which the gear 84 had been rotated by the gear 70, even though the direction of rotation of the motor shaft 36 has been changed. However, the shaft 76 although rotating in the same direction, rotates at a different speed from that previously described, due to the fact that the gear ratio between the gears 72 and 82 is different from the gear ratio between the gears 70 and 84, it being noted from Fig. 3 that the gear 82 is of greater diameter than the gear 84, so that the gear 82 is provided with a greater number of gear teeth than the gear 84. It will also be noted that the speed of operation of gear 72 is determined by the gear ratio of gears 58 and 74, gears 74 and 72 having a 1:1 ratio while the speed of operation of gear 70 depends upon the gear ratio of gears 56 and 70, and since gears 56 and 58 differ in diameter, gears 70 and 72 initially operate at different speeds. Consequently, although the driven shaft 76 always rotates in the same direction, regardless of the direction of rotation of the motor shaft 36, the result of a change of direction of rotation of the motor shaft 36 is that the speed of rotation of the shaft 76 is changed.

While, as previously indicated, the gears associated with the drum 62 cooperate with the gears 82 and 84 provided on the shaft 76 to rotate the latter shaft at a different speed for each direction of rotation of the motor 14, provision is made to selectively provide for a plurality of different speeds of rotation of the output shaft 114 for each direction of rotation of the motor 14. It will be noted from Fig. 3 that the shaft 114 is journalled in bearings 116 and 118 mounted respectively in the casting 24 and in the bearing plate 30. The shaft 114 is also provided with a bearing 120 which loosely mounts a gear 122, a bearing 124 which loosely mounts a gear 126, a bearing 128 which loosely mounts a gear 130, a bearing 132 which loosely mounts a gear 134. It will be noted that said gears differ in diameter, the gear 122 having the smallest diameter and the gear 134 having the largest diameter. The shaft 114 is also provided with a rectangular sleeve 136 which is keyed thereto as at 138 and with a second rectangular sleeve 140 which is keyed thereto as at 142. The sleeve 136 mounts a clutch member or clutch plate 144 which is slidably movable thereon and the sleeve 140 mounts a similar clutch member 146 which is slidably movable on the latter. The clutch member 144 is provided with the openings 150—150 which extend therethrough and which are adapted to receive the pins 152—152, respectively, projecting from one side of the gear 122 or, alternatively, the pins 154—154 projecting from the gear 126 and confronting the pins 152. The clutch member 146 is provided with the aperture 156—156. The gear 130 is provided with the laterally extending pins 158—158 which are adapted to be received by said apertures, respectively, and the gear member 134 is similarly provided with the pin members or lateral projections 160—160 which oppose said projections 158 and which are adapted to be received by said apertures 156—156, respectively. The slidable movement of the clutch member 144 on the rectangular sleeve 136 to engage either the gear 122 or the gear 126 is effected by the rod 162 which is engaged with said clutch member. Similarly, the slidable movement of the clutch member 146 on the rectangular sleeve 140 to engage either the gear 130 or the gear 134 is effected by the rod 164 which is engaged with the clutch member 146. Said rods are journalled in the mounting plate 30 and in the casting 24.

Figure 6:
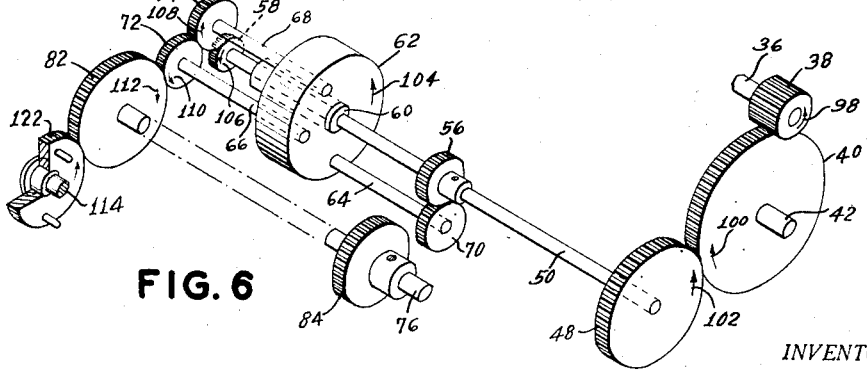
Fig. 6 is a view similar to Fig. 5 with various parts omitted, and illustrates the speed change mechanism in another condition thereof.

Assuming now that the motor 14 is operating or rotating shaft 36 in the direction of the arrow 90 (Fig. 5) so that the shaft 50 rotates in the same direction to drive the shaft 76 at the speed determined by the ratio of the gears 70 and 84, as previously described, it will be apparent that the output shaft 114 can be operated or driven at four different speeds, depending upon which one of the gears 122, 126, 130 or 134 is locked to the output shaft 114 by the clutch mechanism constituted by the clutch members 144 and 146 and the operating mechanism therefor. More particularly, it will be apparent that the manipulation of the rod 162 to engage the clutch plate 144 with the gear 122 will drive the shaft 114 at a speed determined by the gear or speed ratio of the gears 82 and 122. The engagement of the clutch plate 144 with the gear 126 will rotate the shaft 114 at a speed determined by the gear or speed ratio of the gears 84 and 126. Similarly, the operation of the rod 164 to engage the clutch plate 146 with the gear 130 will effect the rotation of the shaft 114 at a speed determined by the gear or speed ratio of the gears 86 and 130. Finally, the engagement of the clutch plate 146 with the gear 134 will result in the operation of the shaft 114 at a speed determined by the gear or speed ratio of the gears 88 and 134. It will be noted that the output shaft 114 is provided, additionally, with a gear 166 which will rotate in the direction of the arrow 168, at one of four different speeds, depending upon which one of the four other gears provided on the shaft 114 is locked thereto through the operation of either the clutch plate 144 or the clutch plate 146, as the case may be. Similarly, it will be apparent that when the motor 14 operates or rotates in the opposite direction, so as to rotate the shaft 36 thereof in the direction of the arrow 98, as illustrated in Fig. 6, the drive shaft 50 operates in the direction of the arrow 104. The driven shaft 76 then rotates at a speed determined by the ratio of the gears 72 and 82, and it will be apparent that the shaft 114 may be operated at four different speeds, which differ from the four previously mentioned speeds, through the selective locking of the various movable gears on the shaft 114, with the latter, through the operation of either the clutch plate 144 or 146. Consequently, the gear 166 may now be operated in the same direction, as previously described, and as indicated by the arrow 168, but in any one of four other and different speeds. Therefore, it will be readily apparent that the gear 168 may be operated in any one of a total of eight different speeds depending, firstly, upon the direction of rotation of the motor 14, as controlled by the previously mentioned double-pole double-throw switch, and, secondly, upon the operation of either the rod 162 or 164, in the manner previously described, for operating the clutch plates. It will be noted that said rods are provided with the knurled finger pieces 170 and 172, respectively.

Provision is made to prevent the operation of either of said rods, while the other of said rods is disposed in a position wherein its associated clutch plate is engaged with an associated gear. More particularly, it will be noted that provision is made for an interlock mechanism, generally indicated by the reference numeral 174, and best illustrated in Figs. 4 and 5. Said interlock mechanism comprises a generally rectangular container 176 for the anti-friction devices or ball bearings 178 which are disposed in a row longitudinally of the box.

At each end thereof, the container 176 is provided with a coiled compression spring 180 which seats against the adjacent end screw in the container and which bears against the adjacent ball bearing 178. It will be noted that the shaft 164 is provided with three notches 182A, 182B and 182C at one side thereof and with a single notch 184 at the other side thereof which is in opposition to the intermediate notch 182B. It will be noted that the three notches 182A, 182B and 182C face the adjacent screw 181A in the container 174. Similarly, the shaft or rod 162 is provided with three notches 186A, 186B and 186C along the side thereof facing the other screw 181B in the container 176. The rod 162 is also provided with a notch 188 in the other side thereof. Therefore, it will be noted that the single notches 184 and 188 of both rods are in confronting disposition and, further, that there are four ball bearings 178 disposed between the rods 164 and 162, which rods extend through the container 176 and are slidably disposed therein. Furthermore, there is a single ball disposed between each of the rods and the adjacent spring 180.

Figure 4:
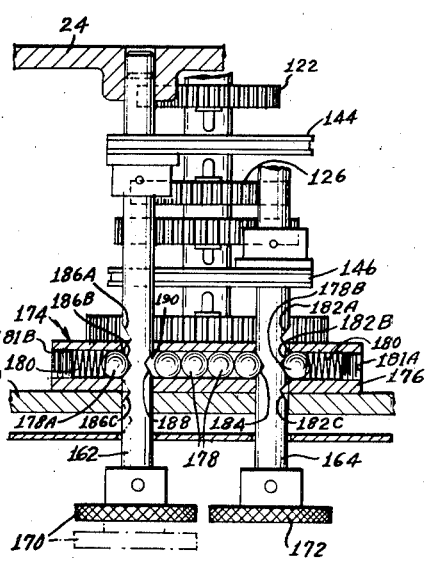
Fig. 4 is a sectional view on an enlarged scale taken on the line 4—4 of Fig. 1.

Figs. 4 and 5 illustrate the neutral or intermediate positions of both rods 162 and 164, wherein it will be noted that the single notches 184 and 188 are disposed completely within the container 176 to provide free space between the confronting single notches, as indicated by the reference numeral 190. In said position both of the clutch members 144 and 146 are disengaged from their associated gears. Assuming now, that the finger piece 170 is moved from the full to the broken line position thereof, as illustrated in Fig. 4, it will be apparent that the clutch plate 144 will be brought into engagement with the gear 126. This will result in the positioning of the notches on the rod 162 in such position that the end ball 178A is now engaged with the notch 186A and the single notch 188 is carried outwardly of the container 176 so that the free space 190 is eliminated and the four intermediate balls are locked in position. In such condition of the parts, it will be apparent that the rod 164 cannot be operated since notch 184 is locked into engagement with the adjacent ball 178. Similarly, when the rod 162 is moved from its neutral position in the opposite direction, so that the end ball 178A is engaged in the notch 186C, the rod 164 cannot be operated. From either position, before the rod 164 can be operated, the rod 162 must be returned to the neutral position thereof illustrated in Figs. 4 and 5. Fig. 1 illustrates the condition wherein the rod 162 is disposed in its neutral position and the rod 164 has been moved to engage the ball 178B, in either the notch 182A or 182C as the case may be, so that the rod 162 is locked in its neutral position and cannot be moved until the rod 164 has been returned to the neutral position thereof.

Figure 3:
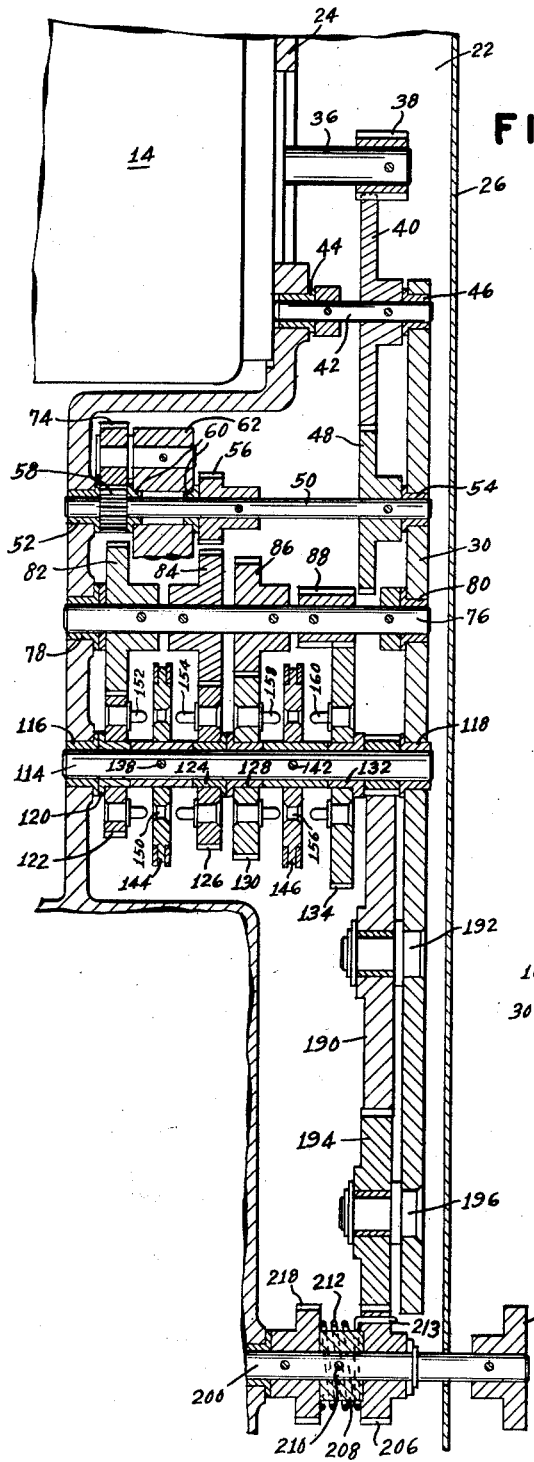
Fig. 3 is a sectional view on an enlarged scale taken on the line 3—3 of Fig. 1.

The previously described eight speed changes are transmitted through the gear 166 to the idler gear 190 which is in mesh with the gear 166. Said idler gear is mounted upon a shaft 192 which is journalled in the mounting plate 30 as illustrated in Fig. 3. The gear 190 meshes with an idler gear 194 which is carried by the shaft 196, the latter being journalled in the mounting plate 30.

Figure 2:
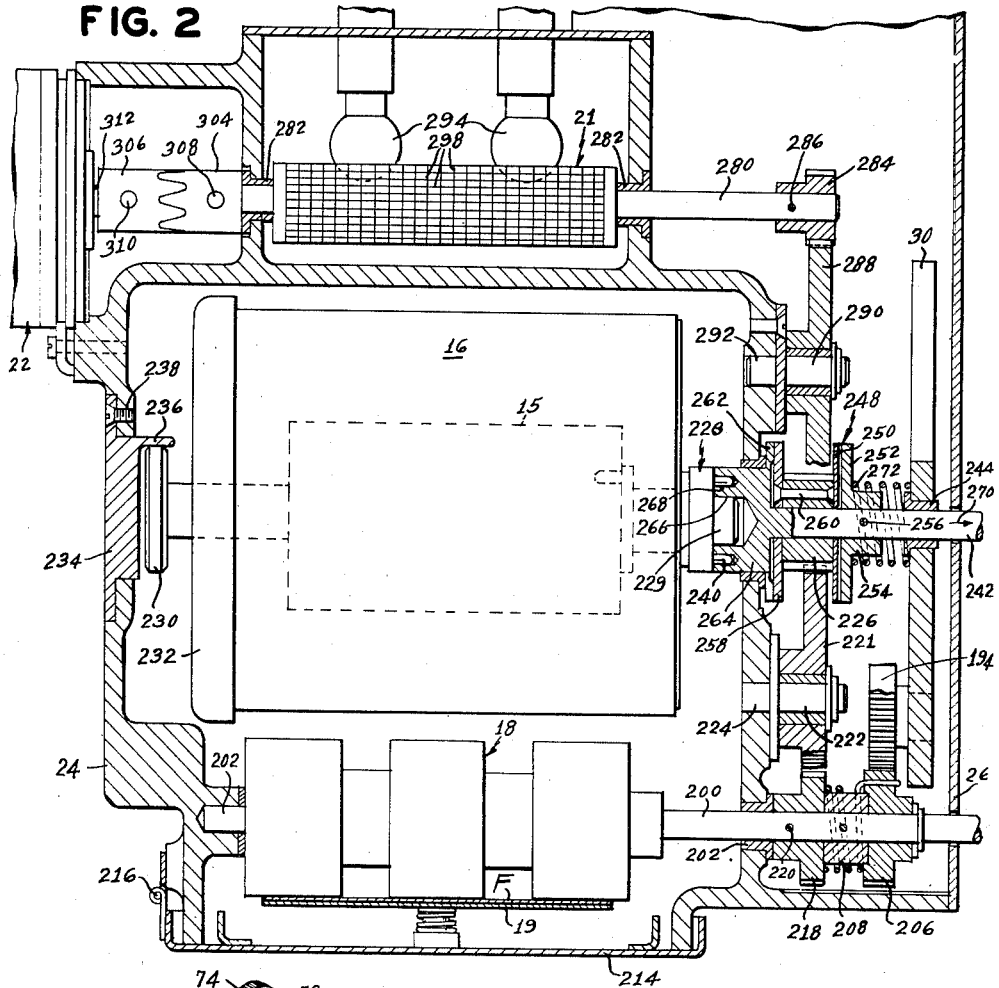
Fig. 2 is a sectional view, on an enlarged scale, taken on the line 2—2 of Fig. 1.

As fully illustrated and described in my copending application, the film F (Fig. 2) passes from the film supply roll 20 thereof through an exposure chamber and into the previously mentioned cassette 16 where it is rolled or rewound on the wind-up roll 15. In order to drive the film, provision is made for a rubber coated film drive or film metering roller 18 and a companion steel pressure roller (not illustrated), provision also being made for a film pressure plate 19. The roller 18 is suitably mounted on a shaft 200 which is journalled in the casting 24 at 202—202. The shaft 200 extends through the cover plate 26 and is provided with a knob or finger piece 204 for manual operation thereof. During the operation of the camera, the roller 18 is motor driven. For this purpose, provision is made for the gear 206 which is mounted on, but not keyed to, the shaft 200. The gear 206 meshes with the previously mentioned gear 194, which, as previously indicated, is driven by the motor 14 through the previously described gear train. The gear 206 rotates the shaft 200 through an over-running clutch constituted by the hub 208 which is keyed to the shaft 200, as at 210, and the compression spring 212 mounted on the hub 208 and engaged with the gear 206 through an end portion 213 of the spring. Due to the provision of said over-running clutch arrangement, the shaft 200, and consequently, the roller 18 may be rotated manually by the knob 204 provided on the shaft 200. The manual rotation of the roller 18 allows for the threading of the film between the roller and the previously mentioned cooperating pressure roller, the film extending from the film supply 20. Provision is made for an access cover 214 which is hinged to the casting 24, as at 216, for obtaining access to the interior of the camera to effect said threading of the film.

The shaft 200 is also provided with a gear 218 which is keyed thereto, as at 220, and which meshes with an idler gear 221 provided on a shaft 222 which is mounted to the casting as at 224. Said idler gear 221 meshes with a gear 226 for driving a collar 228, as hereinafter explained in detail.

As illustrated and described in detail in my copending application, the film cassette 16 is provided with a film wind-up spool onto which the film is rolled after it is driven past the drive roller 18. The film wind-up spool is mounted on a pair of shafts, one of which constitutes a drive shaft, being keyed to the film wind-up roller, as illustrated and described in detail in said copending application, which drive shaft is provided with the drive collar 228. The second shaft is provided with the knob or finger piece 230 which is utilized to remove the cover 232 from the cassette 16, said knob 230 is also utilized to properly center and guide the cassette when inserted into the camera. In this connection, it will be noted that the casting 24 is provided with an insert 234 having a flange 236 against which the knob 230 abuts for centering the film set, the insert being secured as at 238 to the casting. The drive collar 228, which is provided on the drive shaft 229, is provided with the drive pins 240 for effecting the drive of the shaft 229 to which the collar 228 is keyed.

In order to effect the drive of the drive collar 228 provision is made for a shaft 242 on which the previously mentioned gear 226 floats. Said shaft is mounted in a bearing 244 which is mounted in the previously mentioned mounting plate 30. The gear 226 is free on the shaft and drives the latter through a friction clutch 248 which includes a substantially flat spring 250 backed by a flange 252 provided on the hub 254. The hub is keyed to the shaft 242 as at 256. The spring 250 presses the gear 226 toward the adjacent end of the cassette and said gear carries a friction plate 258 which is riveted thereto, as at 260. The friction plate engages a companion clutch plate 262 which is constituted by a flange provided on the hub portion 264 of the shaft 242. The hub is provided with an end centering and mounting opening 266 for the driving collar 228 of the cassette. The hub is also provided with openings 268 for the driving pins 240 provided on the drive collar. In order to permit for the insertion or removal of the cassette into its chamber, the shaft 242 is provided with a knob 246 which is keyed thereto and when the knob is retracted in the direction of the arrow 270 in Fig. 2, a compression spring 272 provided on the shaft between the plate 30 and the flange 252 is compressed, so that when the knob is released, the spring returns the shaft to the position thereof illustrated in Fig. 2. Therefore, it will be readily apparent that the motor 14 drives both the film drive roller 18 and the film wind up spool 15 within the cassette 16 through the previously described gear train. Said gear train includes the described speed change mechanism so that both the film drive roller and the film wind up spool may be driven at the same of any one of eight different speeds, as determined by the positions of the shafts 162 and 164, and the direction of rotation of the motor 14.

As previously indicated, and as illustrated and described in my copending application, provision is made to provide coordinate lines on the film, the photographic exposure or printing of said coordinate lines on the film being accomplished optically and in a continuous operation without the use of shutters or movable devices. Provision is made for the previously mentioned printing roller 21 which is provided on a shaft 280, the latter being journalled in the casting as at 282—282. At one end thereof, the shaft 280 is provided with a gear 284 which is keyed thereto at 286. In order to drive the gear 284, provision is made for an idler gear 288. The idler gear 288 is provided on a shaft 290 which is mounted in the casting 24 as at 292. Said idler gear 288 meshes both with the gear 284 and with the gear 226 whereby the gear 284 is rotated through the previously described gear train which includes the previously described speed change mechanism. Therefore, it will be apparent that the printing roller 21 rotates at the same one of the eight different speeds at which the film drive roller 18 and the wind up roller 15, within the cassette 16, operate. In order to effect the printing operation, provision is made for a pair of lamps 294—294 which shine upon the roller 21 and the light is reflected from the latter onto the film extending from the film supply 20 to the film drive roller 18, which portion of the film is also being exposed through the lens assembly 296, as fully illustrated and described in my copending application. As therein described, the roller 21 has a black or dark background on which are inscribed the white or light colored coordinate lines, generally indicated by the reference numeral 298. As illustrated and described in said copending application, the camera is also provided with an intermittently operated argon glow lamp 300 (Fig. 1) to provide timing dots on the film as it moves between the film supply 20 and the film drive roller 18. A sensing mechanism for indicating the amount of film remaining in the film supply 20 is generally indicated by the reference numeral 302 and is fully described in my copending application.

As indicated in my copending application, the apparatus of the present invention is presently used in connection with an apparatus for recording transient phenomena in the form of vectorcardiograms, as illustrated and described in detail in the copending application, Serial No. 393,312, filed November 20, 1953, by Milton Pelavin and myself. In connection with such apparatus, provision is made for a potentiometer 22 which potentiometer provides for the horizontal deflection of the light spot in the oscilloscope utilized in the apparatus disclosed in the latter application, and said potentiometer must be operated at the same speed as the speed of movement of the film from the film supply 20 to the film cassette 16. In order to effect this result, the shaft 280 which mounts the printing roller, and which is driven through the previously described gear train and speed change mechanism which also drives the film drive roller 18, drives the potentiometer arm through the utilization of the companion clutch members 304 and 306. The clutch member 304 is keyed to the shaft 280 as at 308 and the clutch member 306 is keyed as at 310 to the potentiometer element 312 which drives the movable arm or tap of the potentiometer 22.

The operation of the speed change mechanism of the present invention will be readily apparent from the foregoing description. In this connection, it will be understood that the motor 14 may be operated or rotated in opposite directions and further that the rotation of the motor shaft 36 in one direction provides one predetermined speed of operation of the driven shaft 76 and the rotation of the motor shaft in the opposite direction provides a second speed of operation of the shaft 76, but in the same direction, so as to provide for two basic speeds of operation of the driven shaft in one direction of rotation. Further in this connection, and as previously described, the knobs 170 and 172 may be operated to provide four different speed changes for each basic speed of operation of the shaft 76 so as to provide a total of eight speed changes which are possible with the apparatus of the present invention. While the speed change mechanism of the present invention has been illustrated and described in connection with a camera for the purpose of moving the film through the camera at any one of eight different speeds and, in addition, to operate associated mechanism at the same one of the eight different speeds, it will be understood that the speed change mechanism of the present invention is not limited to use with a camera but may be utilized wherever it is desired to provide a simple mechanism for obtaining eight different speeds of operation.

While I have shown and described the preferred embodiments of my invention, it will be understood that various changes may be made in the idea or principles of the invention within the scope of the appended claims.

Having thus described my invention, what I claim and desire to secure by Letters Patent is:

1. Speed change mechanism comprising, a drive shaft mounted for rotation in opposite directions, a driven shaft, and means operable between said shafts for driving said driven shaft in one direction regardless of the direction of rotation of said drive shaft, said means including first and second driving gears rotated by said driving shaft, driven gears for rotating said driven shaft, a drum releasably rotated by said drive shaft, gear means automatically operable by said drum to be interposed between said first driving gear and one of said driving gears when said driving shaft is rotated in one direction for rotating said driven shaft in a direction opposite to that of the drive shaft, and gear means carried by said drum and including a reversing gear driven by said second drive gear and a gear driven by said reversing gear and operable to drive another of said driven gears of said driven shaft to rotate said driven shaft in the same direction as said first mentioned rotation thereof when the drum is rotated by said drive shaft in a direction opposite to said first mentioned direction.

2. Speed change mechanism comprising, a drive shaft mounted for rotation in opposite directions, a driven shaft, and means operable between said shafts for driving said driven shaft in one direction regardless of the direction of rotation of said drive shaft, said means being operable by said drive shaft and having provision to drive said driven shaft at different speeds for said different directions, respectively, of rotation of said drive shaft, said operating means including a drum having a loose friction fit on said drive shaft, first gear drive means automatically operable between said shafts when said drive shaft rotates in one direction of rotation thereof and said drum is thereby turned in said direction and second gear drive means automatically operable between said shafts when said drive shaft rotate in an opposite direction and said drum is thereby turned in said opposite direction, said gear drive means having different gear ratios and each including a gear mounted by said drum, one of said gear drive means having an odd number of gears for driving said driven shaft in the same direction as said drive shaft, and the other of said gear drive means having an even number of gears for driving said driven shaft in the same direction as said drive shaft.

3. Speed change mechanism comprising, a drive shaft mounted for rotation in opposite directions, a driven shaft, and means operable between said shafts for driving said driven shaft in one direction regardless of the direction of rotation of said drive shaft, said means being operable by said drive shaft and having provision to drive said driven shaft at different speeds for said different directions, respectively, of rotation of said drive shaft, rotatable output means, and selectively operable drive coupling means between said driven shaft and said output means to provide a plurality of different speed drives between said driven shaft and said output means, whereby to provide a first plurality of selective speed operations for said output means when said drive shaft is operating in one direction of rotation thereof and a second plurality of selective speed operations, each different from said first plurality of speed operations, respectively, when said drive shaft is operating in the opposite direction of rotation thereof.

4. Speed change mechanism comprising, a drive shaft mounted for rotation in opposite directions, a driven shaft, and means operable between said shafts for driving said driven shaft in one direction regardless of the direction of rotation of said drive shaft, said means being operable by said drive shaft and having provision to drive said driven shaft at different speeds for said different directions, respectively, of rotation of said drive shaft, rotatable output means, and selectively operable drive coupling means between said driven shaft and said output means to provide a plurality of different speed drives between said driven shaft and said output means, whereby to provide a first plurality of selective speed operations for said output means when said drive shaft is operating in one direction of rotation thereof and a second plurality of selective speed operations, each different from said first plurality of speed operations, respectively, when said drive shaft is operating in the opposite direction of rotation thereof, said output means being provided on a third shaft, and said selectively operable coupling means comprising a first plurality of gears of different diameters, respectively, keyed to said driven shaft, a second plurality of gears of different diameters, respectively, loosely mounted on said third shaft and engaged with said first plurality of gears, respectively, and means for selectively coupling one of said loosely mounted gears to said third shaft for driving the latter.

5. Speed change mechanism comprising, a drive shaft mounted for rotation in opposite directions, a driven shaft, and means operable between said shafts for driving said driven shaft in one direction regardless of the direction of rotation of said drive shaft, said means being operable by said drive shaft and having provision to drive said driven shaft at different speeds for said different directions, respectively, of rotation of said drive shaft, rotatable output means, and selectively operable drive coupling means between said driven shaft and said output means to provide a plurality of different speed drives between said driven shaft and said output means, whereby to provide a first plurality of selective speed operations for said output means when said drive shaft is operating in one direction of rotation thereof and a second plurality of selective speed operations, each different from said first plurality of speed operations, respectively, when said drive shaft is operating in the opposite direction of rotation thereof, said selectively operable drive coupling means having a neutral position in which said output means is decoupled from said driven shaft, an operative position for each speed drive thereof in which said coupling means is operatively engaged between said driven shaft and said output means, and means to prevent the operation of said coupling means to an operative position thereof unless said coupling means is in said neutral position thereof.

6. Speed change mechanism comprising, a drive shaft mounted for rotation in opposite directions, a driven shaft, and means operable between said shafts for driving said driven shaft in one direction regardless of the direction of rotation of said drive shaft, said means being operable by said drive shaft and having provision to drive said driven shaft at different speeds for said different directions, respectively, of rotation of said drive shaft, rotatable output means, and selectively operable drive coupling means between said driven shaft and said output means to provide a plurality of different speed drives between said driven shaft and said output means, whereby to provide a first plurality of selective speed operations for said output means when said drive shaft is operating in one direction of rotation thereof and a second plurality of selective speed operations, each different from said first plurality of speed operations, respectively, when said drive shaft is operating in the opposite direction of rotation thereof, said output means being provided on a third shaft, and said selectively operable coupling means comprising a first plurality of gears of different diameters, respectively, keyed to said driven shaft, a second plurality of gears of different diameters, respectively, loosely mounted on said third shaft and engaged with said first plurality of gears, respectively, and means for selectively coupling one of said loosely mounted gears to said third shaft for driving the latter, and means to prevent the coupling to said third shaft of any one of said loosely mounted gears unless all of said loosely mounted gears are decoupled therefrom.

7. Speed change mechanism comprising, a drive shaft mounted for rotation in opposite directions, a driven shaft, and means operable between said shafts for driving said driven shaft in one direction regardless of the direction of rotation of said drive shaft, said means comprising a rotary member having a loose friction fit on said drive shaft, a pair of gears provided on said drive shaft and driven thereby, a pair of gears provided on said driven shaft for driving the latter, an odd number gear means mounted by said rotary member for engagement with one of said driven shaft gears and engaged with one of said drive shaft gears, and an even number gear means mounted by said rotary member for engagement with the other of said driven shaft gears and engaged with the other of said drive shaft gears, whereby when said drive shaft rotates in one direction said rotary member is rotated thereby in said one direction for engaging said odd number gear means with said one driven shaft gear, and when said drive shaft rotates in the opposite direction, said rotary member is rotated thereby in said opposite direction for engaging said even number gear means with the other of said driven shaft gears.

8. Speed change mechanism comprising, a drive shaft mounted for rotation in opposite directions, a driven shaft, and means operable between said shafts for driving said driven shaft in one direction regardless of the direction of rotation of said drive shaft, said means comprising a rotary member having a loose friction fit on said drive shaft, a pair of gears provided on said drive shaft and driven thereby, a pair of gears provided on said driven shaft for driving the latter, an odd number gear means mounted by said rotary member for engagement with one of said driven shaft gears and engaged with one of said drive shaft gears, and an even number gear means mounted by said rotary member for engagement with the other of said driven shaft gears and engaged with the other of said drive shaft gears, whereby when said drive shaft rotates in one direction said rotary member is rotated thereby in said one direction for engaging said odd number gear means with said one driven shaft gear, and when said drive shaft rotates in the opposite direction, said rotary member is rotated thereby in said opposite direction for engaging said even number gear means with the other of said driven shaft gears, the gear ratio of said odd number gear means and said one drive shaft gear being different from the gear ratio of said even number gear means and said other drive shaft gear, whereby said driven shaft rotates at different speeds in response to the different directions of rotation, respectively, of said drive shaft.

9. Speed change mechanism comprising a drive shaft mounted for rotation in opposite directions, a driven shaft, and an output shaft, means operable between said drive and driven shafts for operating the latter in one direction, regardless of the direction of operation of said drive shaft, and at different speeds for said different directions, respectively, and selectively operable speed transmission means operatively engaged between said driven shaft and said output shaft to provide a plurality of different speed transmission ratios therebetween, whereby to provide a first series of different speeds for said output shaft during the operation of said drive shaft in one direction and a second series of different speeds for said output shaft during the operation of said drive shaft in the opposite direction.

10. Speed change mechanism, as defined in claim 9, further characterized in that said speed transmission means has provision for four speed transmission ratios between said driven and output shafts, whereby to provide a total of eight speed changes in said mechanism.

11. Speed change mechanism comprising a drive shaft mounted for rotation in opposite directions, a driven shaft, and an output shaft, means operable between said drive and driven shafts for operating the latter in one direction, regardless of the direction of operation of said drive shaft, and at different speeds for said different directions, respectively, and selectively operable speed transmission means operatively engaged between said driven shaft and said output shaft to provide a plurality of different speed transmission ratios therebetween, whereby to provide a first series of different speeds for said output shaft during the operation of said drive shaft in one direction and a second series of different speeds for said output shaft during the operation of said drive shaft in the opposite direction, and means to lock said selectively operable means in one of said speed ratios thereof.

12. Speed change mechanism comprising a drive shaft mounted for rotation in opposite directions, a driven shaft, and an output shaft, means operable between said drive and driven shafts for operating the latter in one direction, regardless of the direction of operation of said drive shaft, and at different speeds for said different directions, respectively, and selectively operable speed transmission means operatively engaged between said driven shaft and said output shaft to provide a plurality of different speed transmission ratios therebetween, whereby to provide a first series of different speeds for said output shaft during the operation of said drive shaft in one direction and a second series of different speeds for said output shaft during the operation of said drive shaft in the opposite direction, said selectively operable means having a neutral position in which it is operatively disengaged from said driven and output shafts, and an operative position of engagement between said latter shafts for each speed transmission ratio, respectively, thereof.

13. Speed change mechanism comprising a drive shaft mounted for rotation in opposite directions, a driven shaft, and an output shaft, means operable between said drive and driven shafts for operating the latter in one direction, regardless of the direction of operation of said drive shaft, and at different speeds for said different directions, respectively, and selectively operable speed transmission means operatively engaged between said driven shaft and said output shaft to provide a plurality of different speed transmission ratios therebetween whereby to provide a first series of different speeds for said output shaft during the operation of said drive shaft in one direction and a second series of different speeds for said output shaft during the operation of said drive shaft in the opposite direction, said selectively operable means having a neutral position in which it is operatively disengaged from said driven and output shafts, and an operative position of engagement between said latter shafts for each speed transmission ratio, respectively, thereof, and means to prevent the operation of said selectively operable means to an operative position of engagement thereof unless said selectively operable means is in said neutral position thereof.

14. Speed change mechanism comprising, a drive shaft mounted for rotation in opposite directions, a driven shaft, and means operable by said drive shaft and between said shafts for driving said driven shaft in one direction regardless of the direction of rotation of said drive shaft, rotatable output means, and selectively operable drive coupling means between said driven shaft and said output means to provide a plurality of different speed drives between said driven shaft and said output means, whereby to provide a first plurality of selective speed operations for said output means when said drive shaft is operating in one direction of rotation thereof and a second plurality of selective speed operations, each different from said first plurality of speed operations, respectively, when said drive shaft is operating in the opposite direction of rotation thereof.

15. Speed change mechanism comprising a drive shaft mounted for rotation in opposite directions, a driven shaft, and an output shaft, means operable between said drive and driven shafts for operating the latter in one direction, regardless of the direction of operation of said drive shaft, and selectively operable speed transmission means operatively engaged between said driven shaft and said output shaft to provide a plurality of different speed transmission ratios therebetween, whereby to provide a first series of different speeds for said output shaft during the operation of said drive shaft in one direction and a second series of different speeds for said output shaft during the operation of said drive shaft in the opposite direction.

References Cited in the file of this patent

UNITED STATES PATENTS

| | | |
|---|---|---|
| 1,309,852 | Jensen | July 15, 1919 |
| 1,397,926 | Fekete | Nov. 22, 1921 |
| 1,501,025 | Mason | July 8, 1924 |
| 1,991,756 | Lazich | Feb. 19, 1935 |
| 2,328,227 | Orr | Aug. 31, 1943 |
| 2,505,841 | Shuker et al. | May 2, 1950 |